United States Patent [19]

Schmidt

[11] E Patent Number: Re. 33,679

[45] Reissued Date of Patent: Sep. 3, 1991

[54] COMBINATION SEAT BELT RETRACTOR MECHANISM

[75] Inventor: Timothy J. Schmidt, Troy, Mich.

[73] Assignee: General Safety Corporation, St. Clair Shores, Mich.

[21] Appl. No.: 368,189

[22] Filed: Jun. 19, 1989

Related U.S. Patent Documents

Reissue of:

[64] Patent No.: 4,518,132
Issued: May 21, 1985
Appl. No.: 604,592
Filed: Apr. 27, 1984

[51] Int. Cl.[5] ..... A62B 35/02; B65H 75/48

[52] U.S. Cl. ..... 242/107.4 A; 242/107.4 R

[58] Field of Search ..... 242/107.4 A, 107.4 B, 242/107.4 R, 107.4 C, 107.4 D, 107.7; 280/806; 297/478

[56] References Cited

U.S. PATENT DOCUMENTS

| | | | |
|---|---|---|---|
| 3,862,726 | 1/1975 | Ulrich et al. | 242/107.4 B |
| 4,327,882 | 5/1982 | Frankila | 242/107.4 A |
| 4,436,255 | 3/1984 | Matsui et al. | 242/107.4 A |
| 4,552,319 | 11/1985 | Gavagan et al. | 242/107.4 A |
| 4,566,649 | 1/1986 | Peterson, III | 242/107.4 A |
| 4,573,646 | 3/1986 | Willey | 242/107.4 A |
| 4,583,701 | 4/1986 | Matsui et al. | 242/107.4 A |
| 4,597,546 | 7/1986 | Yamamoto | 242/107.4 A |

*Primary Examiner*—Katherine Matecki
*Attorney, Agent, or Firm*—Harness, Dickey & Pierce

[57] ABSTRACT

A combination seat belt retractor particularly useful for motor vehicles is described. The seat belt retractor according to this invention converts between an emergency locking retractor which locks only when the vehicle is subjected to a deceleration level above a predetermined level to an automatic locking mode wherein the seat belt webbing cannot be withdrawn from the retractor. The convertible feature is particularly advantageous since an emergency locking retractor does not provide the desired firm positioning of child restraint systems. The emergency locking retractor, however, has advantages in terms of occupant comfort and convenience since they permit free movement of the occupants within the vehicle. In accordance with this invention, the retractor is converted to the automatic locking mode by first fully withdrawing the seat belt webbing therefrom. Such action causes a switching lever to force a leaf spring in a position against the retractor locking bar. When, however, a predetermined amount of seat belt webbing is returned upon the retractor spool, the leaf spring returns to its normal position, thereby restoring emergency locking operation to the retractor.

8 Claims, 2 Drawing Sheets

COMBINATION SEAT BELT RETRACTOR MECHANISM

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to a motor vehicle seat belt retractor and particularly to a retractor which can be operated both as an emergency locking retractor or an automatic locking retractor.

Most motor vehicles are equipped with seat belt systems which act to restrain the occupants when the vehicle is subjected to high rates of deceleration which may occur, for example, during a motor vehicle collision. Many seat belt retractors are of the so-called emergency locking variety. These retractors employ an inertia sensitive actuator which prevents seat belt webbing from being withdrawn from the retractor when the vehicle is subjected to deceleration forces above a predetermined level, thereby restraining the vehicle occupant. During normal operating circumstances, however, the seat belt webbing may be freely withdrawn from the retractor, enabling freedom of movement by the vehicle occupants.

Another type of seat belt retractor is often referred to as an automatic locking retractor. When using these retractors, the seat belt webbing is fully withdrawn from the retractor and, as webbing is thereafter retracted within the retractor, a locking bar engages sprockets within the retractor thus preventing withdrawal. These retractors therefore, act as a one-way clutch once the webbing is fully withdrawn, permitting webbing to be retracted within the retractor but not withdrawn. When, however, the seat belt is unfastened and the webbing is fully retracted within the retractor, the webbing can again be withdrawn.

The emergency locking retractor design has many advantages in terms of occupant comfort and convenience, since they permit free movement of the occupants until deceleration forces above a predetermined level are sensed. Emergency locking retractors, however, have been found undesirable when used to fasten a child restraint system within the vehicle. For this application, it is desirable that the seat belt system firmly and securely anchor the child restraint system to the vehicle. Since automatic locking retractors do not permit free withdrawal of webbing, they are preferable for anchoring a child restraint system within the vehicle.

Due to the need to provide adult occupant comfort and convenience, and the need to securely fasten child restraint systems within vehicles, it is desirable to provide a combination seat belt retractor which may be converted between emergency locking operation and automatic locking operation in accordance with the needs of the user. It is therefore a principal object of this invention to provide such a combination seat belt retractor. It is a further object of this invention to provide a combination emergency locking and automatic locking retractor which is easily switched between operational modes. It is yet another object of this invention to provide a combination seat belt retractor which is simple in design and inexpensive. It is yet another object of this invention to provide a combination retractor having an automatic locking mechanism which is independent of the emergency locking inertia actuator, thereby not adversely affecting the reliability of the emergency locking feature of the retractor.

The above principal objects of this invention are achieved by providing an emergency locking retractor having, in addition, a two-position leaf spring which, in one position, acts to directly bias the retractor locking bar against the toothed sprockets of the retractor spool, thereby causing the retractor to operate in an automatic locking mode. The retractor according to this invention further includes a switching lever which moves the leaf spring to the automatic locking position when the seat belt webbing is fully withdrawn from the retractor. The retractor is designed such that when the spool is nearly fully wrapped with seat belt webbing, the leaf spring is pushed to a first normal position wherein it no longer biases the locking bar, thus returning the retractor to emergency locking operation.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
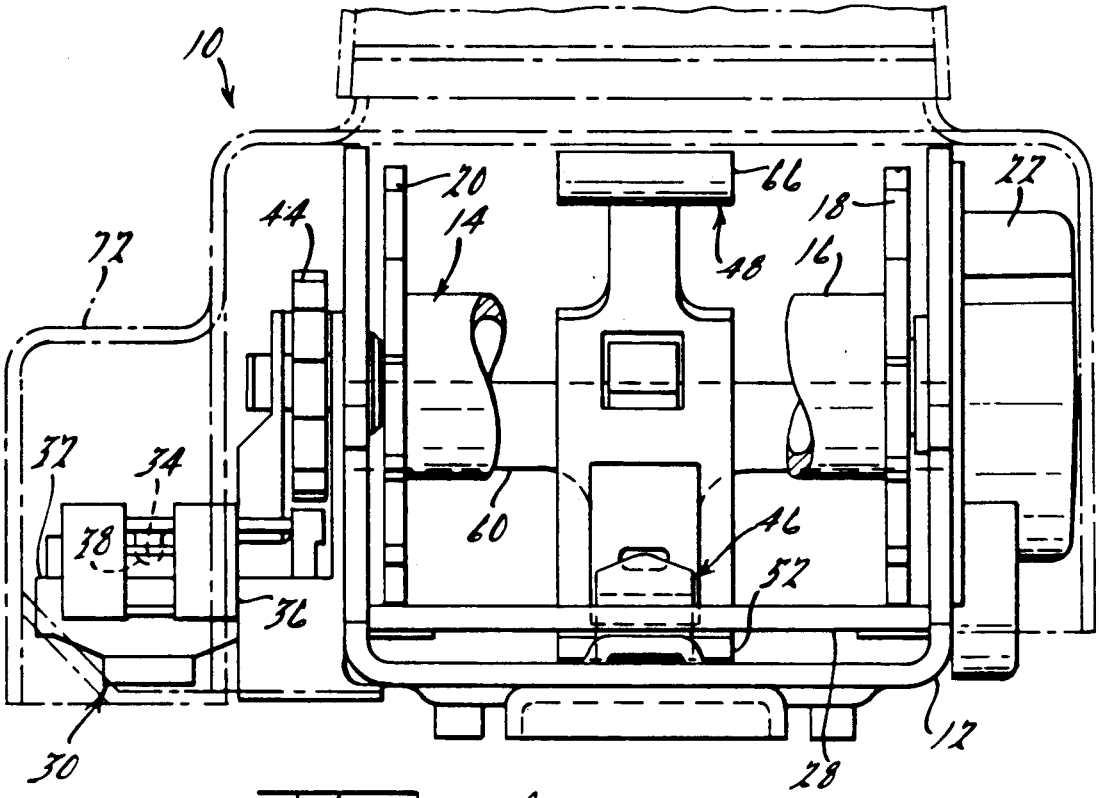
FIG. 1 is a front view of a combination seat belt retractor according to this invention.
Figure 2:
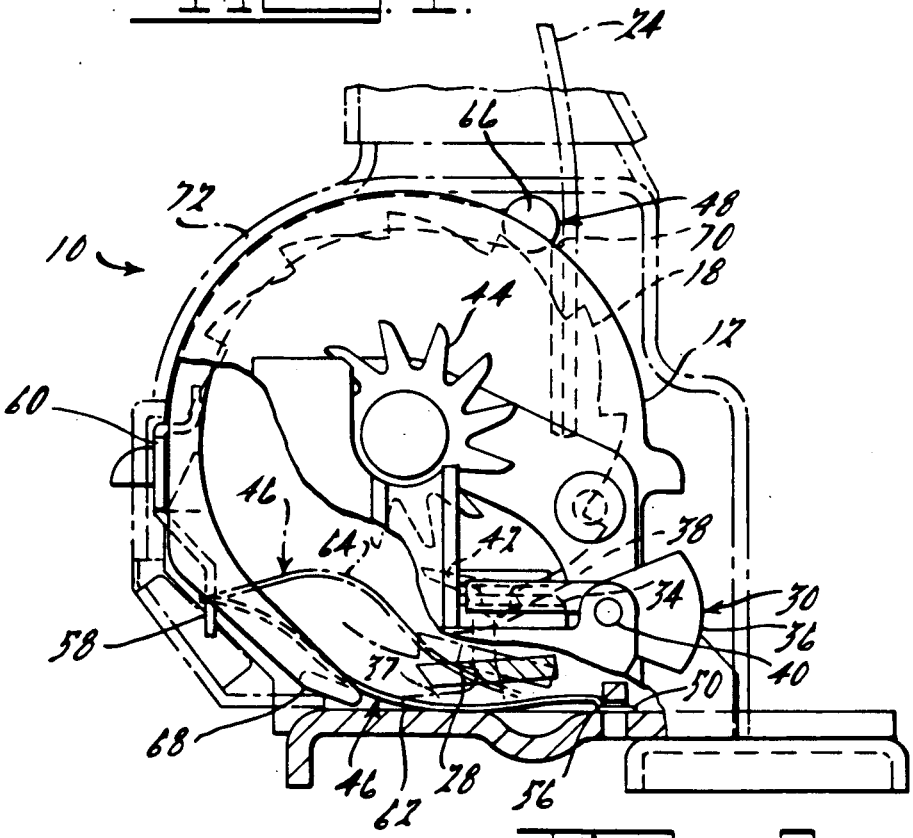
FIG. 2 is a side view of the combination seat belt retractor according to this invention shown by FIG. 1.
Figure 3:
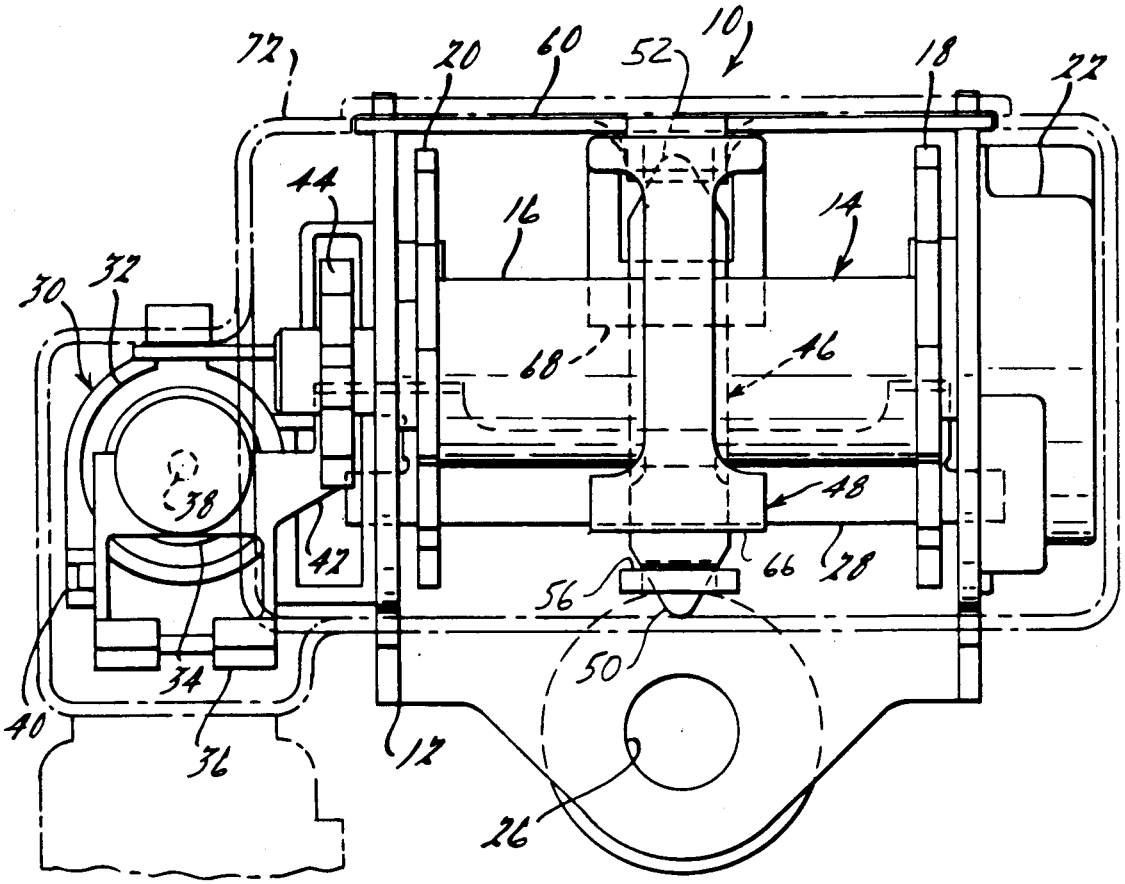
FIG. 3 is a plan view of the combination seat belt retractor shown by FIG. 1.
Figure 4:
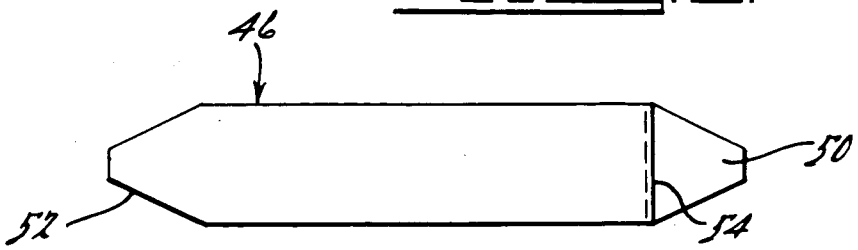
FIG. 4 is a plan view of the leaf spring which is incorporated into the combination seat belt retractor according to this invention.

A combination seat belt retractor according to this invention is shown assembled in FIGS. 1, 2 and 3, and is generally designated there by reference character 10. Retractor assembly 10 includes retractor frame 12 to which rotatable spool 14 is mounted. Spool 14 includes a belt support shaft 16 terminating laterally in a pair of radially extending toothed sprockets 18 and 20. Torsion spring assembly 22 acts upon belt support shaft 16 to rotatably bias spool 14 so that a belt webbing retracting force is applied when webbing 24 is withdrawn from retractor 10. One end of seat belt webbing 24 is attached to belt support shaft 16 and becomes rolled onto spool 14 as it is rotated. Retractor frame 12 includes one or more mounting holes 26 for fasteners which permit secure attachment of retractor 10 to the associated vehicle. Locking bar 28 is particularly shown by FIGS. 1 and 2 and is movable between a first normal position to a second engaging position wherein the locking bar engages one of the teeth of toothed sprockets 18 and 20. Locking bar 28 is caused to move between the position shown by FIGS. 3 and 4 by inertia sensitive actuator 30 which includes; housing 32 attached to frame 12, and internally disposed weighted element 34. Weighted element 34 moves to a tilted position once combination retractor assembly 10 (and the associated motor vehicle) are exposed to deceleration forces above a predetermined level (or when retractor frame 12 is tilted from its installed position). Once weighted element 34 is caused to move to a tilted position, locking lever 36 becomes raised due to contact between the weighted element and lug 38 of the locking lever. Locking lever 36 rotates about pivot 40 between the normal and engaged positions. Retractor frame is preferably enclosed by trim cover 72.

FIG. 2 illustrates the normal position of the components of inertia sensitive actuator 30. When, however, weighted element 34 moves toward a tilted position, locking lever 36 is caused to rotate in a clockwise direction, with respect to the orientations shown by FIG. 2. Once slightly rotated, actuator pawl 42 of locking lever 36 engages a tooth of spur gear 44 which is also rotatable with spool 14. Rotation of spool 14 causes continued rotation of locking lever 36 until locking bar pawl 37 contacts the underside of locking bar 28 urging it into engagement with a tooth of toothed sprockets 18 and 20. Actuator pawl 42 and spur gear 44 are provided to augment the rotational urging forces applied to locking lever 36 as weighted element 34 becomes tilted. Such augmentation results in improved reliability and accuracy of retractor locking and provides positive engagement between locking bar 28 and toothed sprockets 18 and 20.

Figure 5:
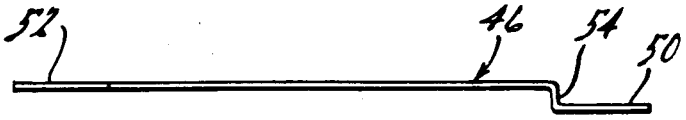
FIG. 5 is a side view of the leaf spring shown by FIG. 4.

The foregoing description describes components of an emergency locking retractor design known to the prior art. In accordance with this invention, retractor 10 is also provided with leaf spring 46 and switching lever 48. Leaf spring 46 is shown in detail by FIGS. 4 and 5 and includes two end tabs 50 and 52, and offset portion 54. The installation of leaf spring 46 within retractor 10 is best shown with reference to FIG. 2. End tab 50 of leaf spring 46 is caused to engage upset slot 56 formed within the lower portion of retractor frame 12. Leaf spring end 52 is inserted within slot 58, formed within cross member 60 which is attached to retractor frame 12. As is shown by FIG. 2, leaf spring 46 is designed to occupy two positions, a first normal position illustrated by the lower phantom line position of leaf spring 46 designated by reference character 62, or a second position 64 shown in a displaced upward position. Leaf spring 46 is caused to assume either position 62 or 64 and snap between such positions by spacing slots 56 and 58 a distance apart less than the length of leaf spring 46 between end tabs 50 and 52. Such spacing prevents leaf spring 46 from occupying a position intermediate of positions 62 and 64 without external forces being applied to the spring. When in second position 64, leaf spring 46 contacts locking bar 28 urging it toward engagement with a tooth of toothed sprockets 18 and 20. When leaf spring 46 is in second position 64, combination seat belt retractor 10 functions as an automatic locking retractor since seat belt webbing 24 cannot be withdrawn from retractor 10 due to engagement between locking bar 28 and toothed sprockets 18 and 20. When leaf spring 46 is in its first position 62, however, normal movement of locking bar 26 in response to inertia sensitive actuator 30 is restored.

Leaf spring 46 is caused to move from position 62 to 64 by the action of switching lever 48. Switching lever 48 is pivotably mounted to cross member 60 and has two terminal ends, 66 and 68. End 66 is positioned to contact an edge 70 of seat belt webbing 24 presented when the webbing is fully withdrawn from spool 14. Alternately, switching may be achieved by a folded over position of webbing 24 or other means of engaging switching lever 48. When such contact occurs, switching lever 48 is caused to rotate about locking bar 28 such that end 68 contacts leaf spring 46 urging it toward second position 64, thus changing the retractor into the automatic locking mode as explained above. When, however, seat belt webbing 24 is returned onto spool 14, the wraps eventually come in driven contact with leaf spring 46 until the leaf spring is caused to return to first normal position 62, at which point the retractor is switched into the emergency locking mode.

In operation, when the user wishes to convert retractor 10 to the automatic locking mode, seat belt webbing 24 is fully withdrawn from the retractor, whereupon edge 70 engages switching lever end 66 which causes leaf spring 46 to assume position 64, thus causing the retractor to switch into the automatic locking mode. After the seat belt latch plate is fastened to the seat belt buckle, the child restraint system is securely fastened within the motor vehicle. When, however, the seat belt buckle is unfastened, seat belt webbing 24 returns to retractor 10 to the extent that leaf spring 46 is caused to move to position 62, thereby returning the retractor to the emergency locking mode. It is desirable to cause such switching to occur at a point where seat belt webbing 24 is nearly fully retracted within retractor 10, therefore avoiding a returning to emergency locking mode while the child restraint system is fastened within the vehicle. When in use by an adult occupant, retractor 10 will normally remain in the emergency locking mode since most adult occupants do not fully withdraw seat belt webbing from a retractor in order to fasten the belt.

In order to not detract from the reliability of inertia sensitive actuator 30, leaf spring 46 and switching lever 48 operate independently from the inertia sensitive actuator since they act directly upon locking bar 28. The design according to this invention further provides a positive indication to the motor vehicle user regarding which mode of operation retractor 10 is in. While in the automatic locking mode, retracting of belt 24 causes an audible clicking sound as locking bar 28 moves along the teeth of tooth sprockets 18 and 20.

While the above description constitutes the preferred embodiments of the present invention, it will be appreciated that the invention is susceptible to modification, variation and change without departing from the proper scope and fair meaning of the accompanying claims.

What is claimed is:

[1. A seat belt retractor which may be operated either as, an emergency locking retractor which prevents seat belt webbing from being withdrawn when the retractor is subjected to deceleration above a predetermined level, or as an automatic locking retractor which acts to retract said webbing but does not permit substantial withdrawal of said webbing comprising;

a retractor frame, a spool rotatable within said frame and having at least one toothed sprocket, a locking bar engageable with said toothed sprocket thereby preventing withdrawal of said webbing from said spool, an inertia sensitive actuator acting upon said locking bar to cause engagement with said toothed sprocket when a deceleration level above said predetermined load is sensed, a leaf spring attached to said retractor frame movable between a first and a second position, in said first position, said leaf spring permitting said locking bar to operate in response to said inertia sensitive actuator whereby said retractor operates as an emergency locking retractor, said leaf spring being forced into said first position when said spool has a predetermined quantity of said webbing wrapped thereon, whereas when said leaf spring is in said second position, said locking bar is forced by said leaf spring into engagement with said toothed sprocket whereby said retractor operates as an automatic locking retractor, and a switching lever affixed to said retractor frame, said switching lever acting upon said leaf spring forcing said spring into said second position when said webbing is withdrawn from said spool.]

[2. A seat belt retractor according to claim 1 further comprising switching means associated with said webbing engaging and said switching lever when said webbing is withdrawn from said spool.]

[3. A seat belt retractor according to claim 2 wherein said switching means comprises a free end of said seat belt webbing which engages said switching lever.]

[4. A seat belt retractor according to claim 1 wherein said switching lever is arcuate in shape and said switching lever is pivotably attached to said retractor frame.]

[5. A seat belt retractor according to claim 4 wherein said switching lever forms first and second terminal ends, said first terminal end engaging said switching means, said second terminal end engaging said leaf spring and moving said leaf spring to said second position when said switching means engages said first terminal end.]

[6. A seat belt retractor according to claim 4 wherein said switching lever pivots about a cross member component of said retractor frame.]

[7. A seat belt retractor according to claim 1 wherein said leaf spring forms two tapered ends, each of said ends engaging notches formed by said retractor frame.]

[8. A seat belt retractor according to claim 7 wherein said leaf spring further forms an offset adjacent one of said ends.]

[9. A seat belt retractor according to claim 7 wherein said notches formed by said retractor frame are spaced such that said leaf spring tends to remain in either said first or said second position.]

[10. A seat belt retractor according to claim 7 wherein one of said notches is formed by a cross member component of said retractor frame.]

*11. In a motor vehicle seat belt retractor which may be operated either as an emergency locking retractor which prevents seat belt webbing from being withdrawn when the retractor is subjected to deceleration above a predetermined level, or as an automatic locking retractor which acts to retract said webbing but does not permit substantial withdrawal of said webbing, including a retractor frame, a spool rotatable within said frame and having a spindle upon which said webbing is wrapped and a pair of toothed sprockets on opposite ends thereof, a locking bar engageable with said toothed sprockets for restricting withdrawal of said webbing from said spool, and an inertia sensitive actuator acting upon said locking bar to cause engagement of said locking bar with said toothed sprockets when a deceleration of said vehicle above said predetermined level is sensed, the improvement comprising:*

*a leaf spring positioned between said toothed sprockets and having two ends and a center portion between said ends, each of said ends being mounted to said retractor frame at attachment points fixed with respect to said retractor frame and separated by a distance less than the free length of said spring, said spring being movable between a first state wherein said spring center portion is deflected away from said spool and disengaged from said locking bar wherein said locking bar is permitted to operate solely in response to said internal sensitive actuator whereby said retractor operates as an emergency locking retractor, and a second state wherein the center portion of said spring is deflected toward said spool and acts by direct contact with said locking bar biasing said locking bar into engagement with said toothed sprockets causing said locking bar to engage with said toothed sprockets to engage the teeth of said sprockets to restrict withdrawal of said webbing while allowing said locking bar to ride over said teeth upon retraction of said webbing whereby said retractor operates as an automatic locking retractor; and*

*a web sensing lever pivotably mounted to said retractor frame and defining first and second arms on either side of said pivot axis, said lever being pivotable between a first position and a second position, in said second position said first arm engaging said spring center portion and forcing said spring into said second state, said second arm positioned to engage said webbing when substantially all of said webbing has been withdrawn from said spool causing said lever to move to said second position through contact with said webbing, and when said lever is in said second position and said webbing is being retracted onto said spool, said spring is oriented such that when the diameter of the total wraps of webbing on said spool reaches a predetermined diameter, said wraps directly contact said spring center portion forcing said spring to switch from said second state to said first state.*

*12. The seat belt retractor of claim 11 wherein said leaf spring ends are tapered and each of said ends engage notches formed by said retractor frame at said mounting points.*

*13. The seat belt retractor of claim 12 wherein one of said notches is formed by a cross member component of said retractor frame.*

*14. The seat belt retractor of claim 11 wherein said leaf spring further forms an offset adjacent one of said ends.*

*15. The seat belt retractor of claim 11 wherein said pivot axis for said web sensing lever is parallel to the axis of rotation of said spool.*

*16. The seat belt retractor of claim 11 wherein said spring is unstable at intermediate positions between said first and second states and is stable at either of said first and second states.*

*17. The seat belt retractor of claim 16 wherein said spring assumes an arcuate configuration in both of said first and second states such that said center section of said leaf spring is disposed on one side of a straight line between said spring ends in said first state and on an opposite side of said line in said second state and said spring center portion intersecting said line when said spring is in an intermediate state between said first and second states.*

*18. The seat belt retractor of claim 11 wherein when said spring is in said second state acting upon said locking bar, retraction of said webbing onto said spool causes said locking bar to ratchet along said toothed sprockets against the biasing force exerted by said leaf spring.*

* * * * *